United States Patent
Akaike et al.

(10) Patent No.: US 10,625,608 B2
(45) Date of Patent: Apr. 21, 2020

(54) VEHICLE MONITOR DEVICE

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/210,858

(22) Filed: Dec. 5, 2018

(65) Prior Publication Data

US 2019/0176626 A1   Jun. 13, 2019

(30) Foreign Application Priority Data

Dec. 11, 2017   (JP) ................. 2017-236911

(51) Int. Cl.
| | |
|---|---|
| *B60N 3/00* | (2006.01) |
| *B60K 35/00* | (2006.01) |
| *B60R 11/02* | (2006.01) |
| *B60R 11/00* | (2006.01) |

(52) U.S. Cl.
CPC ............. *B60K 35/00* (2013.01); *B60N 3/001* (2013.01); *B60R 11/0235* (2013.01); *B60K 2370/1442* (2019.05); *B60K 2370/152* (2019.05); *B60K 2370/77* (2019.05); *B60R 2011/0029* (2013.01); *B60R 2011/0282* (2013.01); *B60R 2011/0294* (2013.01)

(58) Field of Classification Search
CPC ...... B60K 2370/1442; B60K 2370/152; B60K 2370/77; B60K 35/00; B60N 3/001; B60R 11/0235; B60R 2011/0029; B60R 2011/0282; B60R 2011/0294
USPC .................................................. 345/1.1, 156
See application file for complete search history.

(56) References Cited

U.S. PATENT DOCUMENTS

| | | | |
|---|---|---|---|
| 10,169,678 B1* | 1/2019 | Sachdeva | G06F 3/04842 |
| 2002/0003571 A1* | 1/2002 | Schofield | B60C 23/00 348/148 |
| 2003/0125873 A1* | 7/2003 | Yamaguchi | B60K 35/00 701/400 |
| 2003/0210159 A1* | 11/2003 | Arunkumar | G08G 1/0962 340/988 |
| 2007/0146560 A1* | 6/2007 | Plavetich | B60R 11/00 348/837 |
| 2008/0129684 A1* | 6/2008 | Adams | B60K 35/00 345/156 |
| 2008/0133133 A1* | 6/2008 | Abels | G01C 21/26 701/469 |
| 2009/0160732 A1* | 6/2009 | Kimura | G01C 21/3664 345/1.1 |

(Continued)

FOREIGN PATENT DOCUMENTS

JP   10-167082   6/1998

*Primary Examiner* — Tony O Davis
(74) *Attorney, Agent, or Firm* — Greenblum & Bernstein, P.L.C.

(57) ABSTRACT

A vehicle monitor device for a vehicle that includes at least a first seat and a second seat, the vehicle monitor device including: a monitor which is electrically connected to a computer of the vehicle and which can be used for driving the vehicle; and a moving mechanism capable of moving the monitor between a position where the monitor can be used for driving by an occupant seated on the first seat and a position where the monitor can be used for driving by an occupant seated on the second seat.

17 Claims, 15 Drawing Sheets

(56) References Cited

U.S. PATENT DOCUMENTS

| | | | |
|---|---|---|---|
| 2009/0171529 A1* | 7/2009 | Hayatoma | B60K 35/00 701/36 |
| 2010/0051766 A1* | 3/2010 | Bonito | B60R 11/0235 248/205.1 |
| 2010/0194596 A1* | 8/2010 | Wang | B60R 1/00 340/936 |
| 2013/0106995 A1* | 5/2013 | Jeon | B60K 37/06 348/43 |
| 2014/0375543 A1* | 12/2014 | Ng-Thow-Hing | G06F 3/012 345/156 |
| 2015/0002991 A1* | 1/2015 | Vander Sluis | B60R 11/0235 361/679.01 |
| 2015/0178034 A1* | 6/2015 | Penilla | G06Q 20/18 345/1.1 |
| 2016/0272065 A1* | 9/2016 | Tsushima | B60K 35/00 |
| 2016/0328619 A1* | 11/2016 | Yi | G06K 9/00798 |
| 2017/0217290 A1* | 8/2017 | Yoshizumi | G09G 3/20 |
| 2018/0304905 A1* | 10/2018 | Yamada | B60W 50/10 |
| 2018/0335626 A1* | 11/2018 | Ji | B60K 35/00 |
| 2018/0345962 A1* | 12/2018 | Konishi | B60W 30/10 |
| 2018/0348751 A1* | 12/2018 | Newman | G05D 1/0055 |
| 2018/0348758 A1* | 12/2018 | Nakamura | G05D 1/0061 |
| 2018/0373250 A1* | 12/2018 | Nakamura | G05D 1/0088 |
| 2019/0051175 A1* | 2/2019 | Ho | G08G 1/13 |
| 2019/0124301 A1* | 4/2019 | Yoshii | H04N 7/183 |
| 2019/0141280 A1* | 5/2019 | Bottomly | H04N 5/655 |
| 2019/0168611 A1* | 6/2019 | Helot | G06F 3/0488 |
| 2019/0193752 A1* | 6/2019 | Amano | B60W 50/14 |
| 2019/0225239 A1* | 7/2019 | Sasaki | B60K 35/00 |
| 2019/0270458 A1* | 9/2019 | Shimotani | B60W 50/10 |

* cited by examiner

VEHICLE MONITOR DEVICE

CROSS-REFERENCE TO RELATED APPLICATIONS

This application claims priority from Japanese Patent Application No. 2017-236911 filed on Dec. 11, 2017, the entire contents of which are incorporated herein by reference.

TECHNICAL FIELD

The present disclosure relates to a vehicle monitor device including a monitor which can be used in vehicle driving or the like.

BACKGROUND

A position adjustment device configured to be capable of adjusting a position of a steering wheel used for driving a car is disclosed in JP-A-H10-167082. The position adjustment device can widen an adjustment range of a position of the steering wheel by varying a tilt angle and a telescopic length of the steering wheel.

However, the position adjustment device of a steering wheel described above is a device which adjusts a position of the steering wheel according to a physique of an occupant seated on a driver seat. Therefore, for example, it is not possible to adjust the position of the steering wheel so that the occupant seated on a seat other than the driver seat can drive.

SUMMARY

The present disclosure has been made to solve the above problem, and the problem to be solved by the present disclosure is to allow an occupant seated on any one of a plurality of seats of a vehicle to perform a driving operation of the vehicle.

The above-described problem is solved by each disclosure. A first aspect of the disclosure is a vehicle monitor device for a vehicle that includes at least a first seat and a second seat, the vehicle monitor device including: a monitor which is electrically connected to a computer of the vehicle and which can be used for driving the vehicle; and a moving mechanism capable of moving the monitor between a position where the monitor can be used for driving by an occupant seated on the first seat and a position where the monitor can be used for driving by an occupant seated on the second seat.

DETAILED DESCRIPTION

First Embodiment

Figure 1:
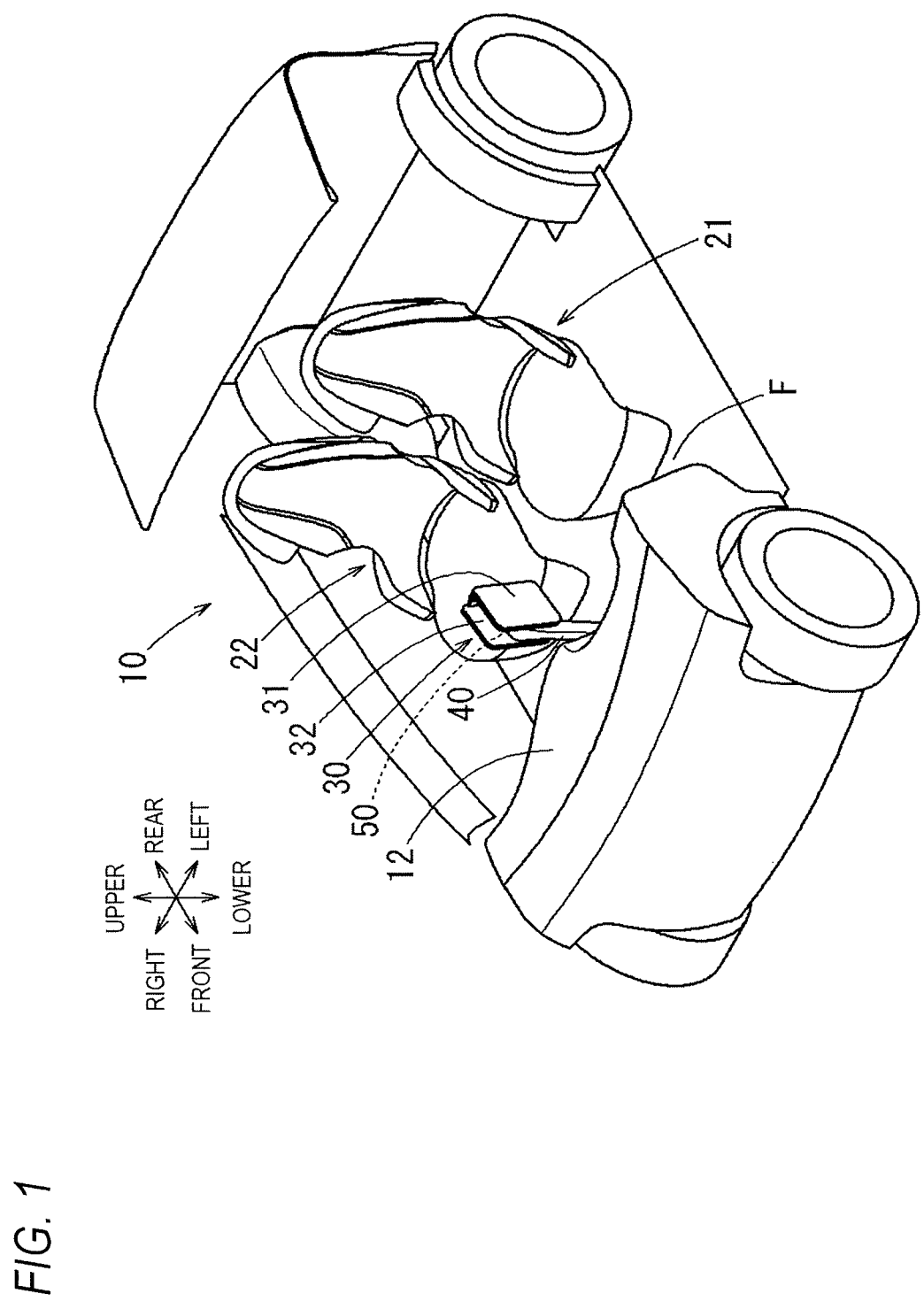
FIG. 1 is a schematic perspective view of a car including a monitor device according to a first embodiment of the present disclosure.

Hereinafter, a vehicle monitor device according to the first embodiment of the present disclosure will be described with reference to FIGS. 1 to 15. The monitor device according to the present embodiment is a monitor device used in a car capable of automatic driving. Here, the front, rear, left, right, upper and lower directions shown in the drawing correspond to the front, rear, left, right, upper and lower directions of the car including the monitor device.

Overview of Car 10

Figure 2:
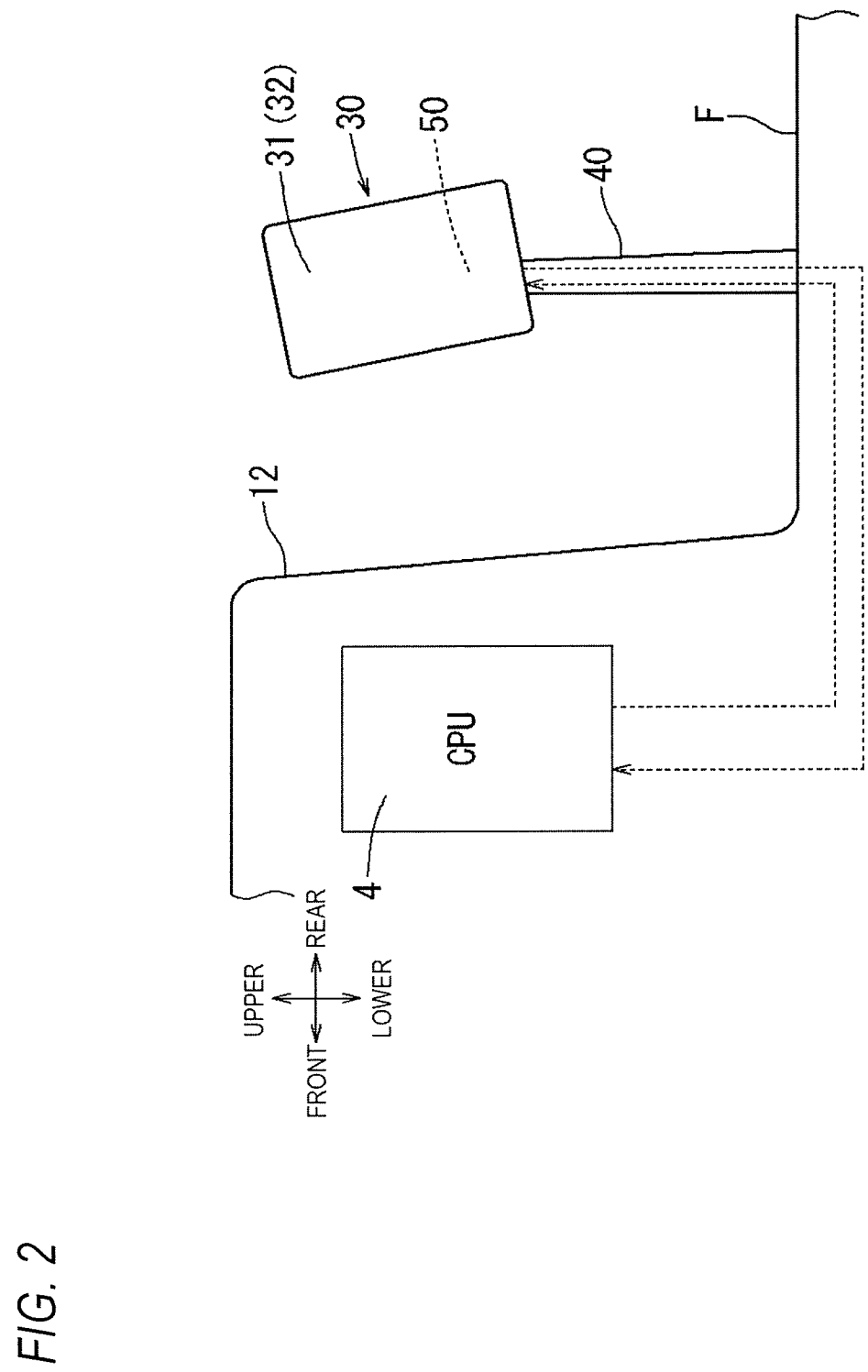
FIG. 2 is a signal block diagram of the monitor device.

A car 10 is capable of automatic driving. As shown in FIGS. 1 and 2, the car 10 is installed with, for example, a computer 14 for performing an automatic driving operation of the car 10 and other control operations in a dashboard 12 provided on a front portion of a car interior. Left and right seats 21, 22 are installed in the car interior. A seat moving device (not shown) including a back-forth slide mechanism, an elevating mechanism, a rotation mechanism, and the like is provided below each of the seats 21, 22. By operating an operation lever (not shown) mounted to each of the seats 21, 22, the seat moving device operates based on a signal from the computer 14. Further, in front of the left and right seats 21, 22, a monitor device 30 is erected upright at a central position in a car width direction. Here, in FIG. 1, a windshield, a front roof panel, left and right doors, and the like constituting a car interior are omitted.

Monitor Device 30

Figure 4:
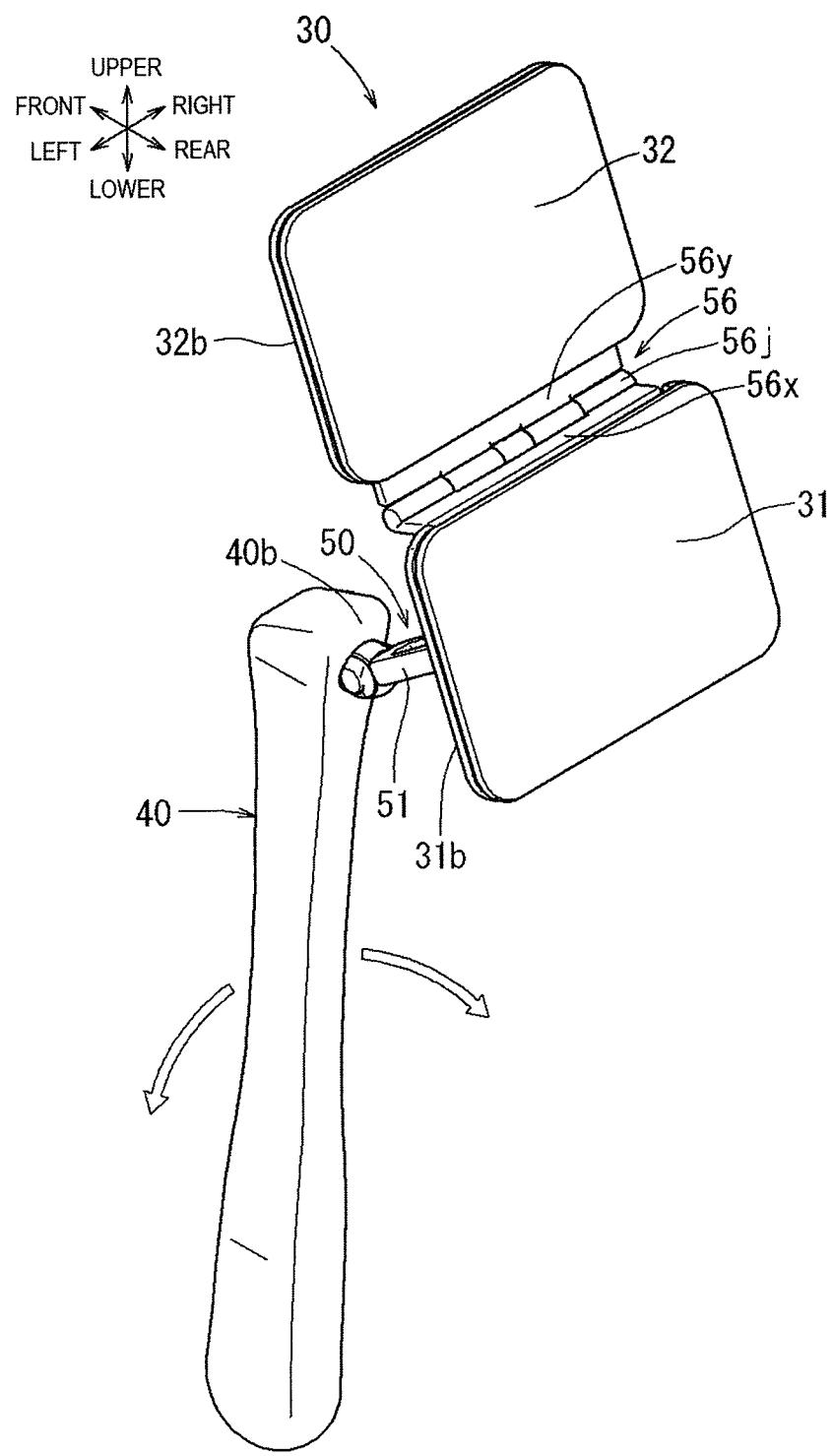
FIG. 4 is a perspective view showing the monitor device used for driving the car.
Figure 5:
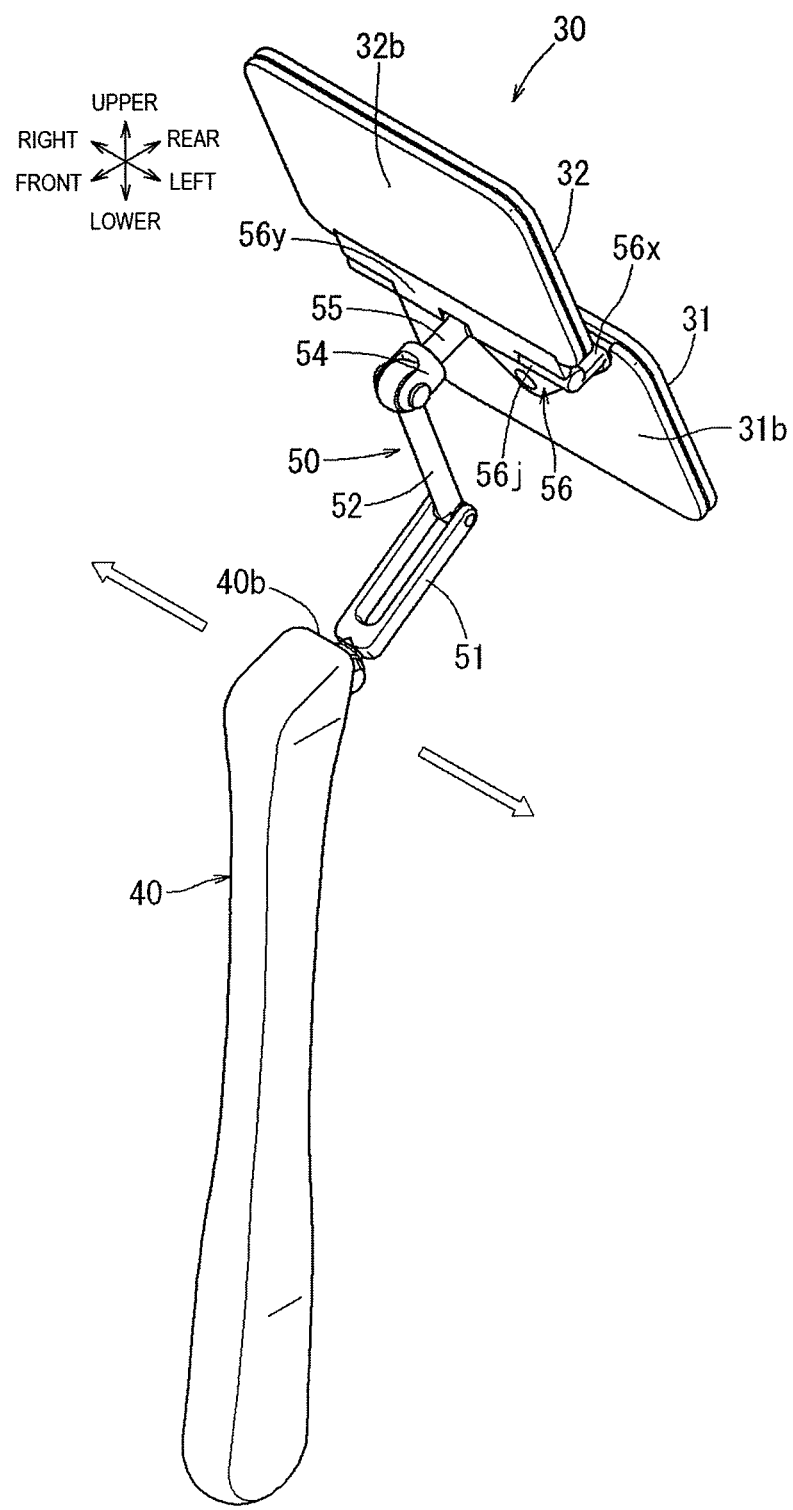
FIG. 5 is a perspective view of the monitor device used for driving the car as viewed from a back side.

As shown in FIGS. 4, 5, and the like, a monitor device 30 is a device configured to be able to use a monitor including a first monitor component 31 and a second monitor component 32 in a multi-functional manner in the car interior. The monitor device 30 includes the first monitor component 31, the second monitor component 32, a supporting column 40 as a moving mechanism for moving the monitor components 31, 32, and a posture changing mechanism 50 configured to be able to change a posture of each of the monitor components 31, 32. Hereinafter, the first monitor component 31 and the second monitor component 32 will be referred to as a first monitor 31 and a second monitor 32. As shown in FIG. 2, the monitor device 30 is configured to be capable of transmitting and receiving signals to and from the computer 14. Since the computer 14 operates based on an input signal from the monitors 31, 32, the supporting column 40 is inclined, the monitors 31, 32 are moved to a predetermined position, and the posture changing mechanism 50 operates to set the posture of the monitors 31, 32 according to the usage.

Supporting Column 40

As shown in FIG. 2, a supporting column 40 is erected upright on a floor surface F of the car interior, and a supporting column inclination mechanism (not shown), which is configured to be inclined at a predetermined angle in a direction of 360° from a position (original position) where the supporting column 40 stands perpendicularly to the floor surface F toward radially outer sides of the supporting column 40, is provided under the floor. Thus, for example, the first monitor 31 and the second monitor 32 can be moved in a left-right direction by inclining the supporting column 40 from the original position shown in FIG. 1 to the left-right direction. Further, the first monitor 31 and the second monitor 32 can be moved in a front-rear direction by inclining the supporting column 40 from the original position to the front-rear direction. Further, the position of the first monitor 31 and the second monitor 32 can also be adjusted by inclining the supporting column 40 from the original position to an oblique direction.

Posture Changing Mechanism 50

A posture changing mechanism 50 is a mechanism for changing the postures of the monitors 31, 32 according to the usage of the first monitor 31 and the second monitor 32. As shown in FIG. 5, etc., the posture changing mechanism 50 includes a first link 51 and a second link 52. A base end portion of the first link 51 is vertically pivotably connected to a tip end portion rear surface 40b of the supporting column 40, and a base end portion of the second link 52 is vertically pivotably connected to a tip end of the first link 51. A bearing part 54 is connected to a tip end of the second link 52 in a vertically pivotable state, and a base end portion of a rotation shaft 55 is supported on the bearing part 54 in a state of rotatable around an axis. Further, a longitudinal central portion of a hinge shaft 56j of a hinge mechanism 56 is fixed at a right angle to a tip end of the rotation shaft 55. Here, pivoting of the first link 51, the second link 52 and the bearing part 54, and the rotation of the rotation shaft 55 are performed by a motor or the like (not shown).

Figure 9:
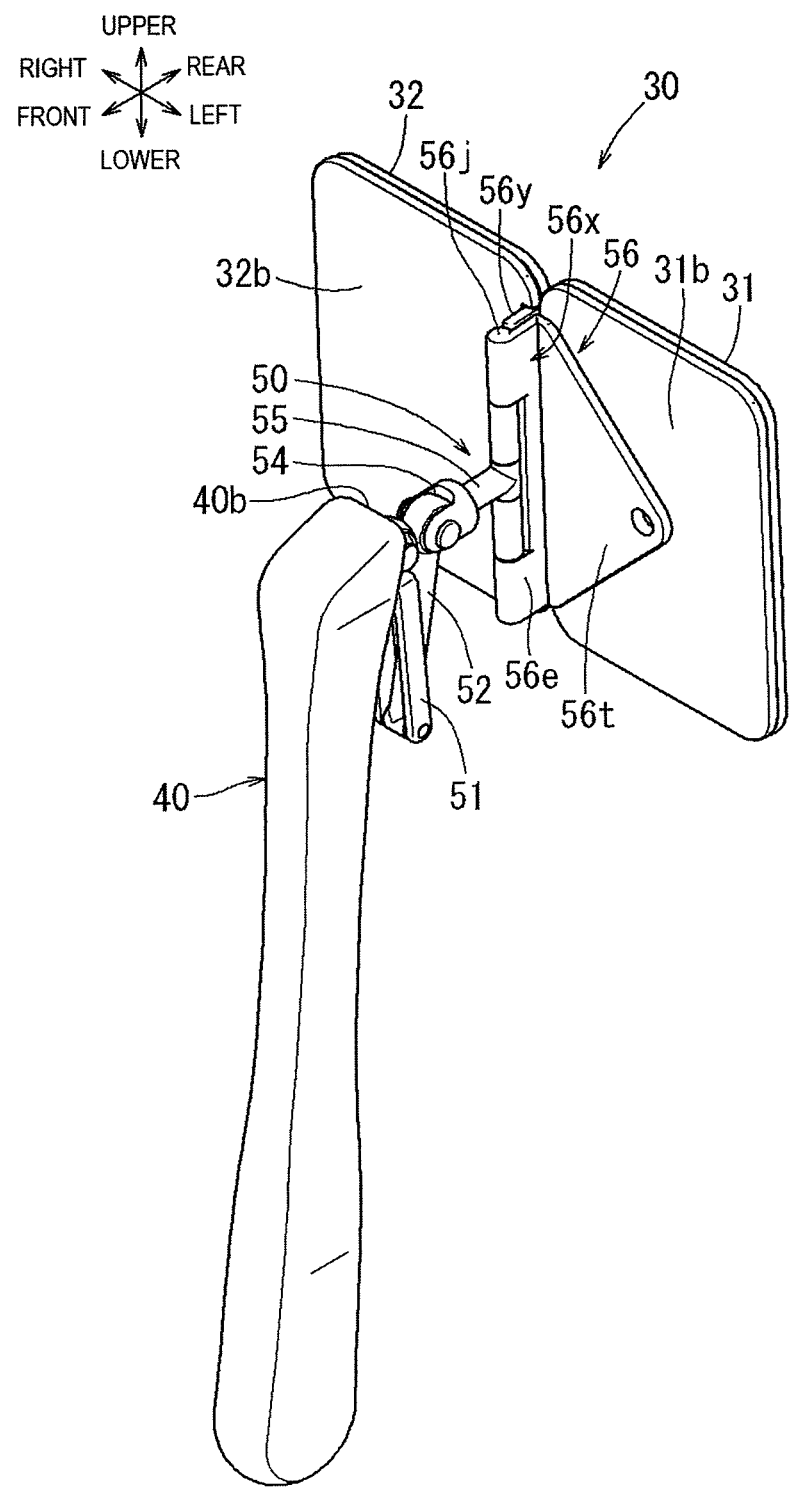
FIG. 9 is a perspective view of the monitor device used as a large-sized television as viewed from the back side.

As shown in FIGS. 5 and 9, the hinge mechanism 56 includes a first hinge plate 56x and a second hinge plate 56y which are connected so as to be relatively pivotable about a hinge shaft 56j. As shown in FIG. 9, the first hinge plate 56x includes a band plate part 56e of which an end edge is connected to the hinge shaft 56j and a triangular plate part 56t and is formed to have an L-shaped cross section, and the triangular plate part 56t is connected to a first back plate 31b of the first monitor 31 in an overlapped manner. As shown in FIG. 5, the second hinge plate 56y is formed in a band plate shape and is connected in a state where the end edge at an opposite side of the end edge connected to the hinge shaft 56j is relatively pivotable to the end edge of a second back plate 32b of the second monitor 32. Here, the relative pivoting of the first hinge plate 56x and the second hinge plate 56y in the hinge mechanism 56, and pivoting of the second monitor 32 (second back plate 32b) with respect to the second hinge plate 56y is performed by a motor or the like (not shown).

With the above configuration, in FIG. 5, by pivoting (left pivoting) the first link 51 upward with respect to the supporting column 40 and pivoting (right pivoting) the second link 52 upward with respect to the first link 51, the first link 51 and the second link 52 are unfolded upward, and the first monitor 31, the second monitor 32, and the like are raised. On the contrary, by pivoting (right pivoting) the first link 51 downward with respect to the supporting column 40 and pivoting (left pivoting) the second link 52 downward with respect to the first link 51, the first link 51 and the second link 52 are folded, and the first monitor 31, the second monitor 32 and the like are lowered. In addition, in FIG. 5, the first monitor 31 and the second monitor 32 approach a horizontal state by pivoting (left pivoting) the bearing part 54 upward with respect to the second link 52, and the first monitor 31 and the second monitor 32 approach a standing state by pivoting (right pivoting) the bearing part 54 downward. Further, the hinge shaft 56j of the hinge mechanism 56 can be vertical or horizontal by rotating the rotation shaft 55. That is, the first link 51 and the second link 52 correspond to a link mechanism of the present disclosure, and the bearing part 54 and the rotation shaft 55 correspond to the rotation mechanism of the present disclosure.

First and Second Monitors 31, 32

Figure 13:
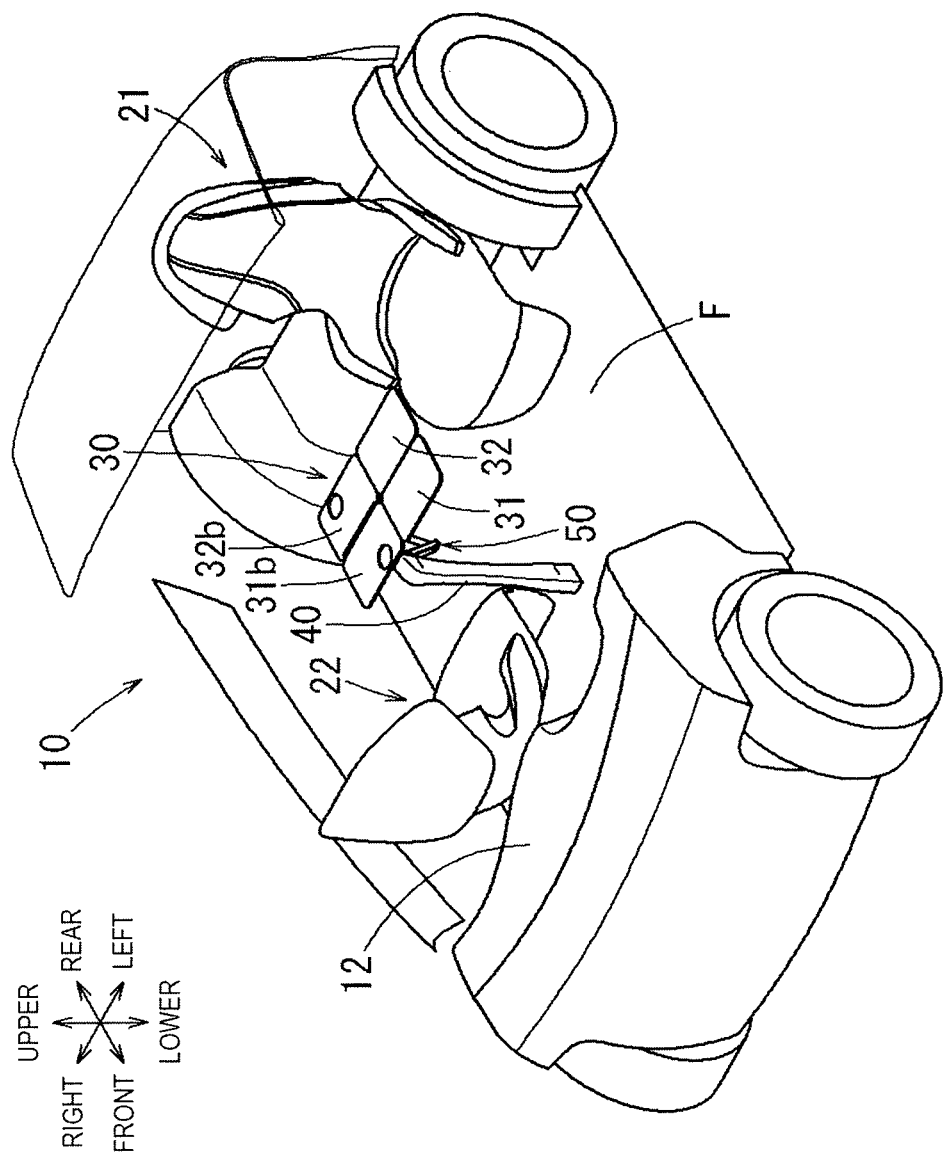
FIG. 13 is a schematic perspective view showing a state where the monitor device is used as a table.

The first monitor 31 and the second monitor 32 are monitors of equal size formed in a substantially rectangular plate shape. As shown in FIG. 5 and the like, the first monitor 31 is used as a monitor in a state of being overlapped with the first back plate 31b having the equal size. Further, as shown in FIG. 13, the first monitor 31 is configured to be used as a table by being unfolded into a state where a monitor surface faces upward and is juxtaposed with respect to the first back plate 31b. Similarly, the second monitor 32 is used as a monitor in a state of being overlapped with the second back plate 32b having the equal size. Further, as shown in FIG. 13, the second monitor 32 is configured to be used as a table by being unfolded into a state where the monitor surface faces upward and is juxtaposed with respect to the second back plate 32b.

Use Mode (Driving Mode) of the Monitor Device 30

Figure 3:
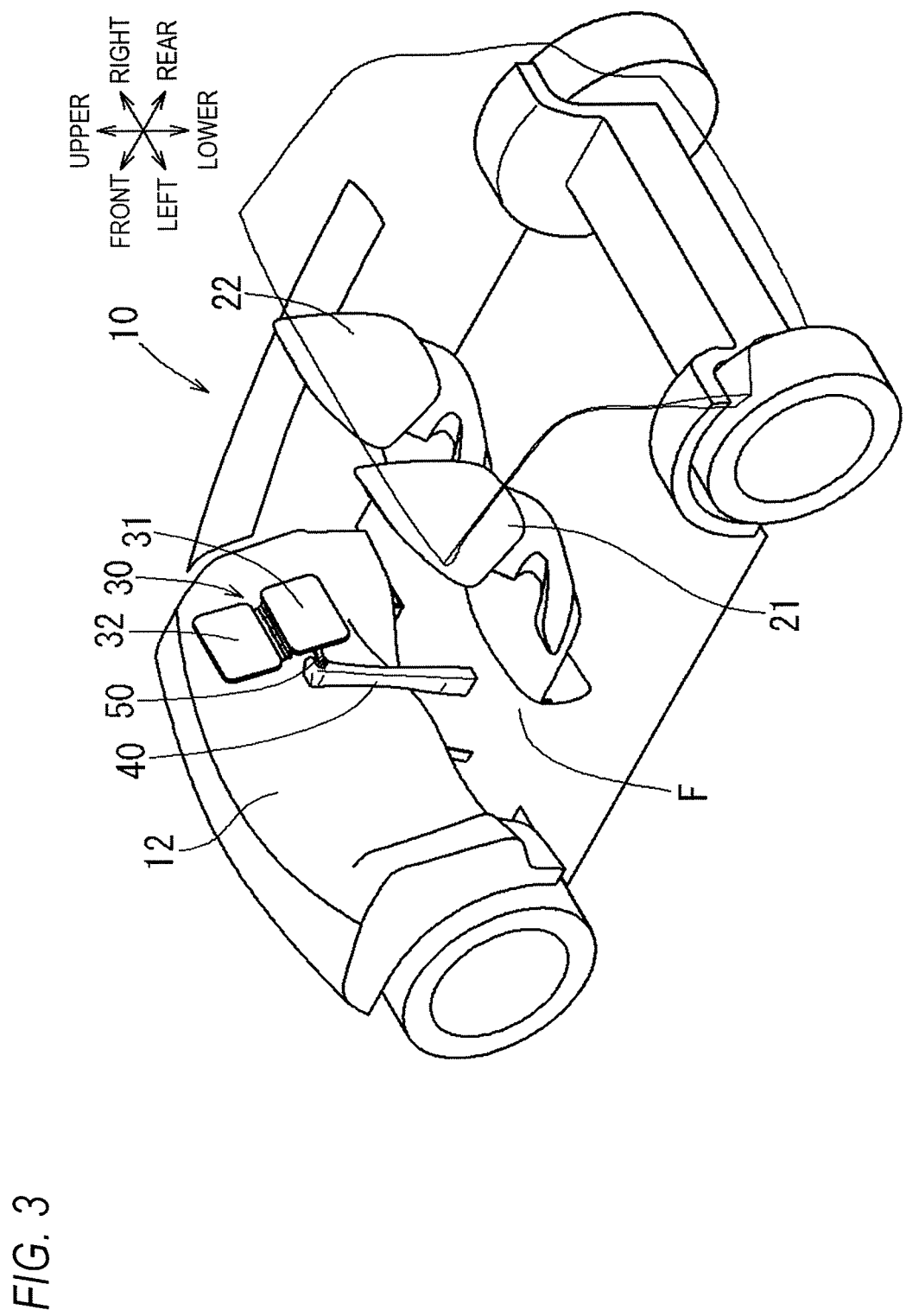
FIG. 3 is a schematic perspective view showing a state where the monitor device is used for driving the car.

The monitor device 30 can be used for driving the car 10. When the monitor device 30 is used for driving the car 10, for example, display (not shown) of a driving mode displayed on the first monitor 31 or the second monitor 32 is touched. Display (not shown) of a seat for performing driving is touched. As a result, for example, when driving is performed at a right seat 22, as shown in FIG. 3, the supporting column 40 of the monitor device 30 is inclined in the right direction by a predetermined angle, and the first monitor 31 and the second monitor 32 are arranged in front of the right seat 22. Next, the posture changing mechanism 50 operates to unfold the first monitor 31 and the second monitor 32. Specifically, as shown in FIG. 5, the first link 51 and the second link 52 of the posture changing mechanism 50 are unfolded upward to raise the first monitor 31 and the second monitor 32 to predetermined height positions. Further, the rotation shaft 55 rotates, and the hinge shaft 56j of the hinge mechanism 56 is held substantially horizontally in a state where the bearing part 54 and the rotation shaft 55 are held at a predetermined angle (substantially right angle in FIG. 5) with respect to the second link 52. Next, the first monitor 31 and the second monitor 32 are unfolded to a position substantially perpendicular to the rotation shaft 55 by the operation of the hinge mechanism 56. As a result, the first monitor 31 and the second monitor 32 are erected in a state of being inclined forward, and the first monitor 31 and the second monitor 32 can be used for driving the car 10.

Figure 6:
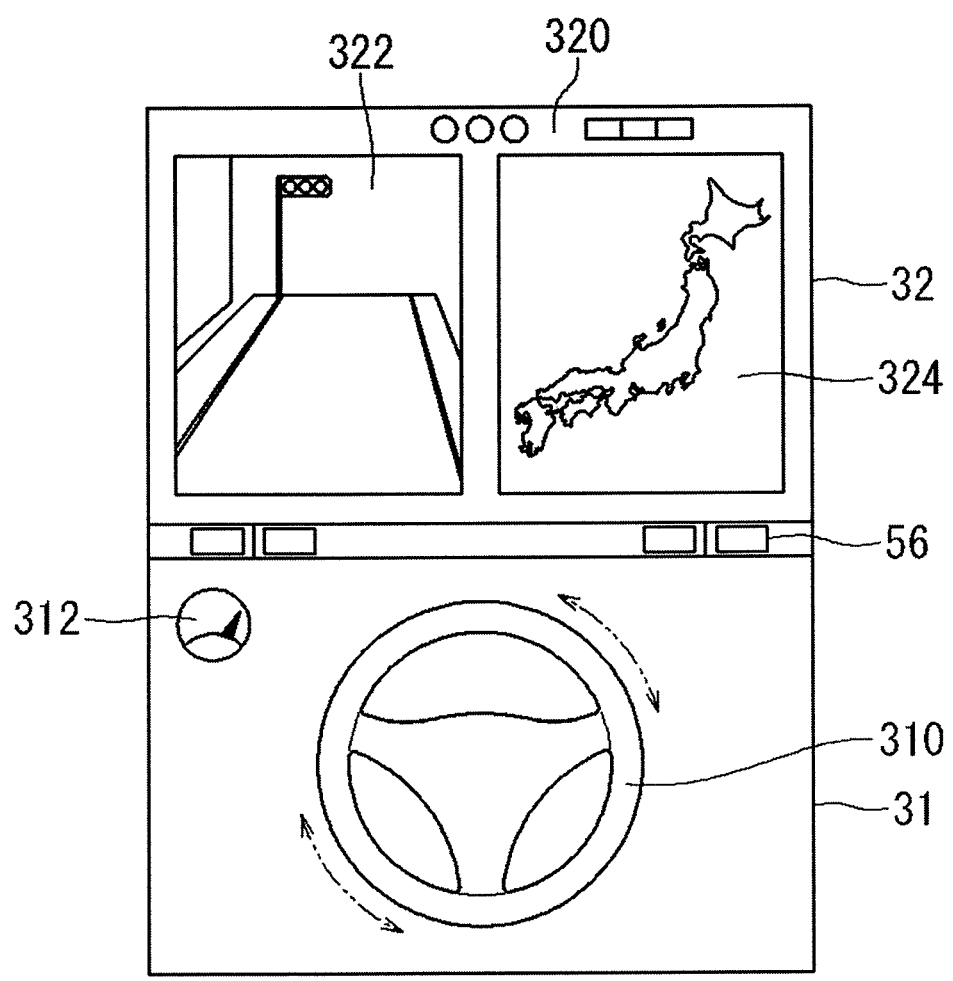
FIG. 6 is a view showing an example of a display state of a monitor of the monitor device used for driving the car.

In the driving mode, as shown in FIG. 6, for example, an image of steering wheel 310 and an image of speedometer 312 are displayed on the first monitor 31. By touching and operating the image of steering wheel 310 manually, the car 10 can be driven manually. The second monitor 32 displays, for example, various display devices, an image of switches 320, an image of drive recorder 322, and an image of navigation 324, etc. Further, when a driver seat is changed to a left seat 21, display of the left seat 21 displayed on the monitors 31, 32 is touched. As a result, the supporting column 40 of the monitor device 30 is inclined in the left direction, and the first monitor 31 and the second monitor 32 are arranged in front of the left seat 21. Further, when the driving mode is stopped and the car 10 is automatically driven, the monitor device 30 is returned to an original position shown in FIG. 1 by touching stop display of the driving mode displayed on the monitors 31, 32.

Use Mode of Monitor Device 30 (Partition Plate Mode)

When the monitor device 30 is used as a partition wall between the left seat 21 and the right seat 22, for example, display (not shown) of a partition wall mode displayed on the monitors 31, 32 is touched. Thus, the supporting column 40 of the monitor device 30 is inclined at a predetermined angle in the rear direction from the state shown in FIG. 1, and the first link 51 and the second link 52 of the posture changing mechanism 50 are further unfolded in the extending direction, so that the first monitor 31 and the second monitor 32 in the form of vertical walls are arranged between the left seat 21 and the right seat 22. In this state, the first monitor 31 and the second monitor 32 serve as a partition wall between the left seat 21 and the right seat 22.

Use Mode of Monitor Device 30 (Large-Sized Television Mode)

Figure 7:
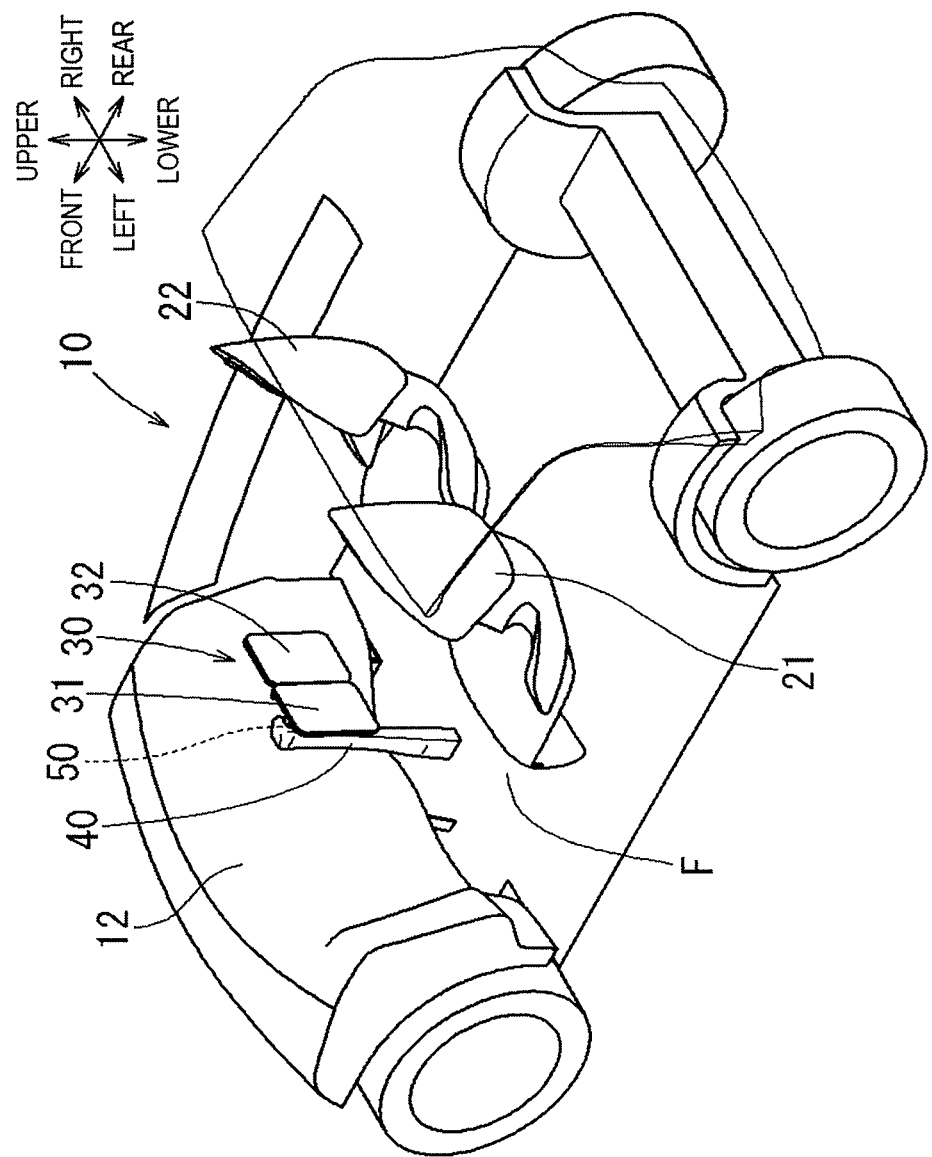
FIG. 7 is a schematic perspective view showing a state where the monitor device is used as a large-sized television.
Figure 8:
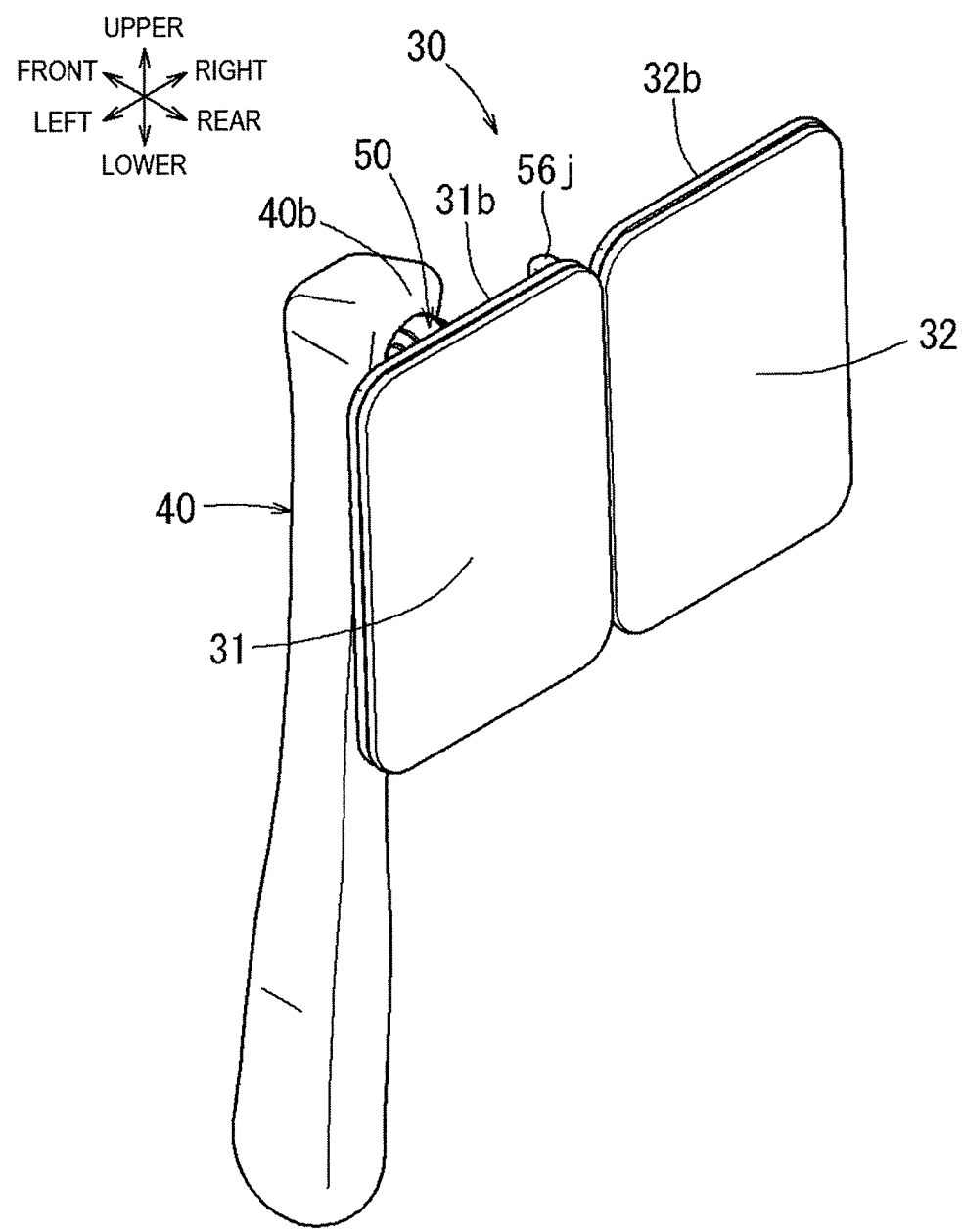
FIG. 8 is a perspective view showing the monitor device used as a large-sized television.

When the monitor device 30 is used as a large-sized television, for example, display (not shown) of the large-sized television mode displayed on the monitors 31, 32 is touched. As a result, as shown in FIG. 7, the posture changing mechanism 50 is operated and the first monitor 31 and the second monitor 32 are unfolded in a state where the supporting column 40 of the monitor device 30 stands up at the original position. Specifically, as shown in FIG. 9, the first link 51 and the second link 52 of the posture changing mechanism 50 are operated to adjust the first monitor 31 and the second monitor 32 to predetermined height positions. Further, the rotation shaft 55 rotates and the hinge shaft 56j of the hinge mechanism 56 is held to be vertical in a state where the bearing part 54 and the rotation shaft 55 are held at a predetermined angle with respect to the second link 52. Next, by the operation of the hinge mechanism 56, the first monitor 31 and the second monitor 32 are unfolded to the left and right so that the first monitor 31 and the second monitor 32 are arranged on the same plane. Accordingly, as shown in FIG. 8, the first monitor 31 and the second monitor 32 become one continuous monitor, and can be used as the large-sized television.

Use Mode of Monitor Device 30 (Individual Television Mode)

Figure 10:
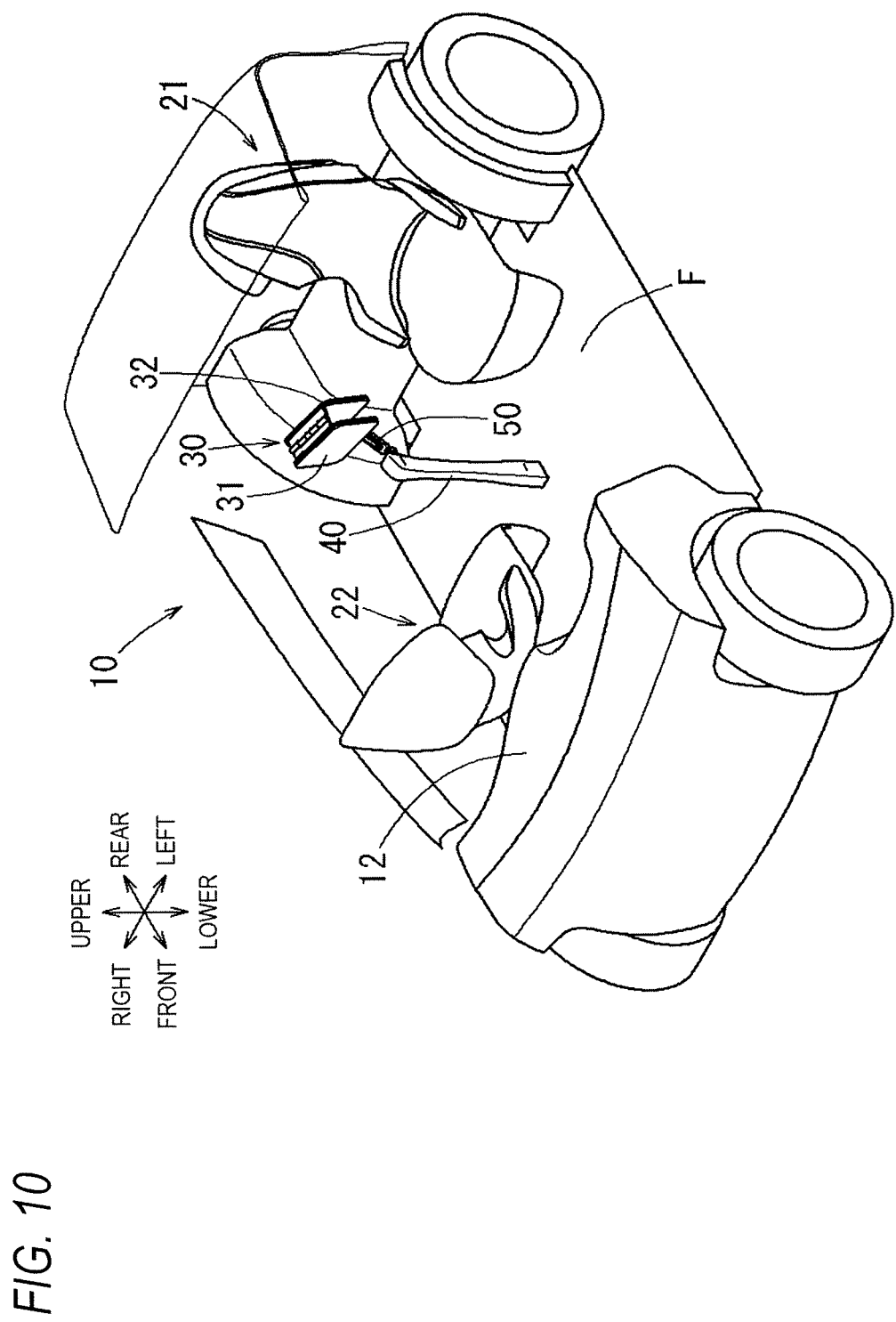
FIG. 10 is a schematic perspective view showing a state where the monitor device is used as individual televisions.
Figure 11:
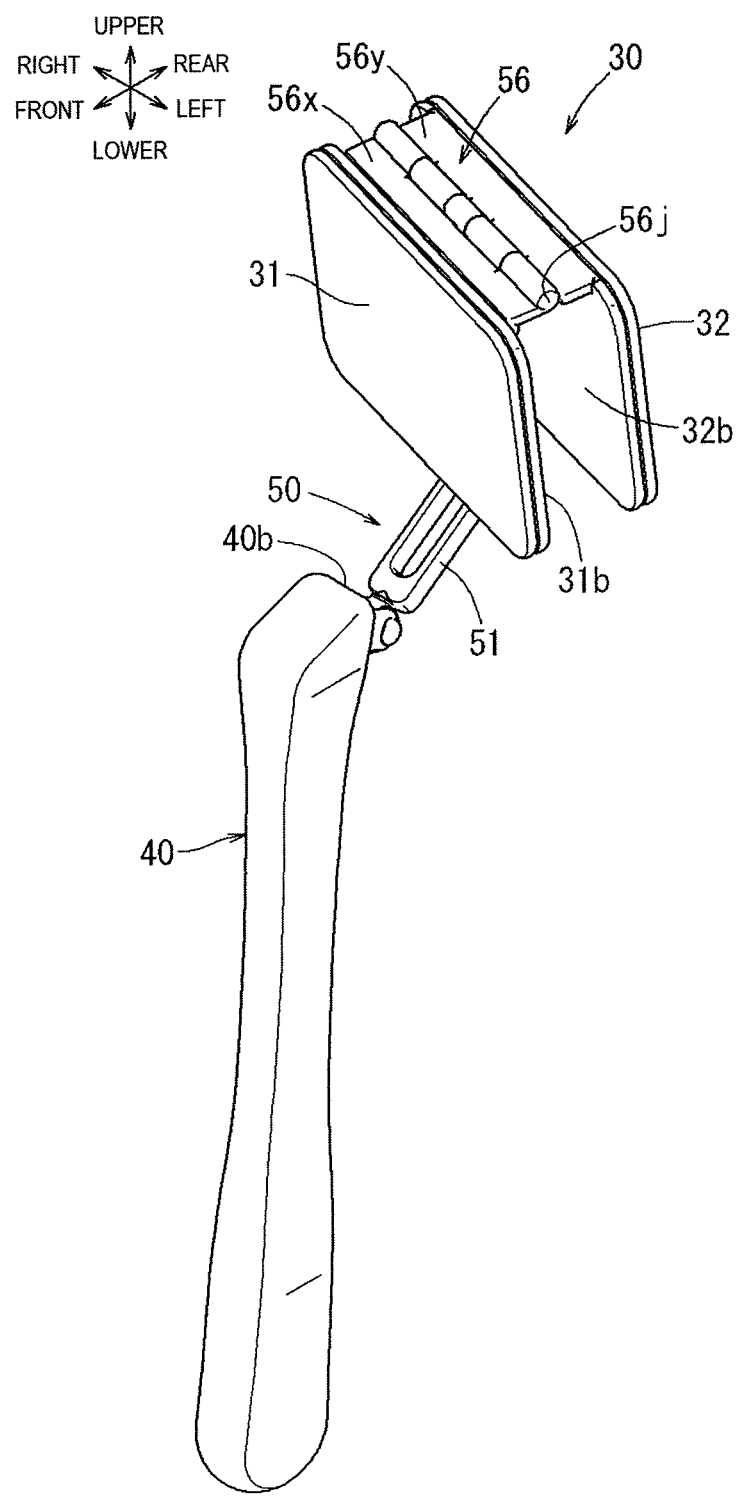
FIG. 11 is a perspective view showing the monitor device used as individual televisions.

As shown in FIG. 10, when the left seat 21 and the right seat 22 in the car interior are arranged to face each other, the first monitor 31 and the second monitor 32 can be used as individual televisions. In this case, for example, display (not shown) of an individual television mode displayed on the monitors 31, 32 is touched. Thus, as shown in FIGS. 10 to 11, the supporting column 40 of the monitor device 30 is inclined in the center direction of the left seat 21 and the right seat 22 which face each other. Thus, the first monitor 31 and the second monitor 32 are arranged at the center of the left seat 21 and the right seat 22. Next, as shown in FIGS. 11 and 12, the first link 51 and the second link 52 of the posture changing mechanism 50 are operated to adjust the first monitor 31 and the second monitor 32 to predetermined height positions.

Figure 12:
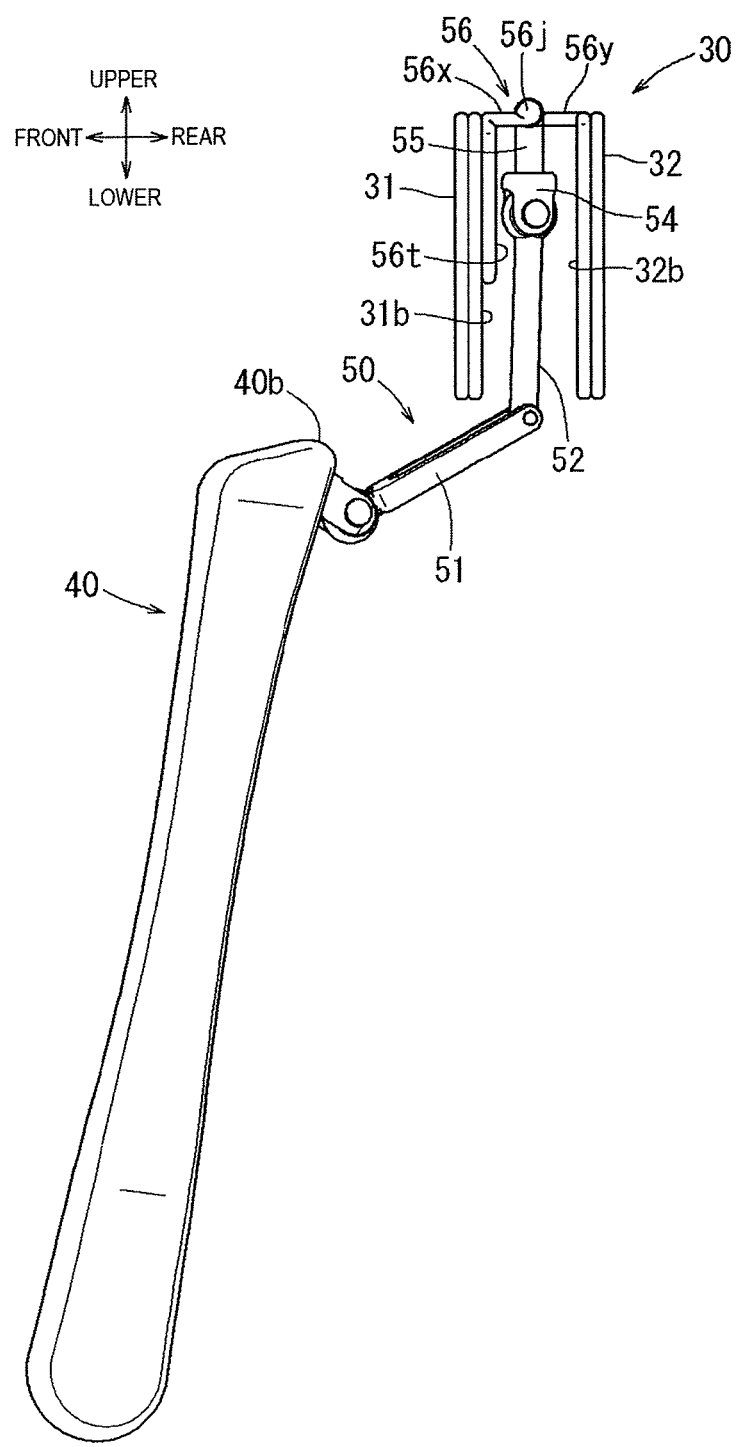
FIG. 12 is a side view showing the monitor device used as individual televisions.

At this time, the second link 52 is held in an upright state as shown in FIG. 12. Further, the bearing part 54 and the rotation shaft 55 are held on an extension line of the second link 52, and the hinge shaft 56j of the hinge mechanism 56 is held horizontally. In this state, the rotation shaft 55 rotates, and further, the orientation of the first monitor 31 and the second monitor 32 is adjusted by the operation of the hinge mechanism 56 while the back surface sides of the first monitor 31 and the second monitor 32 face each other. Accordingly, as shown in FIG. 10, the first monitor 31 and the second monitor 32 can be used as individual televisions. Further, the first monitor 31 and the second monitor 32 can also be used as partition walls by turning off a switch of the television.

Use Mode of Monitor Device 30 (Table Mode)

Figure 14:
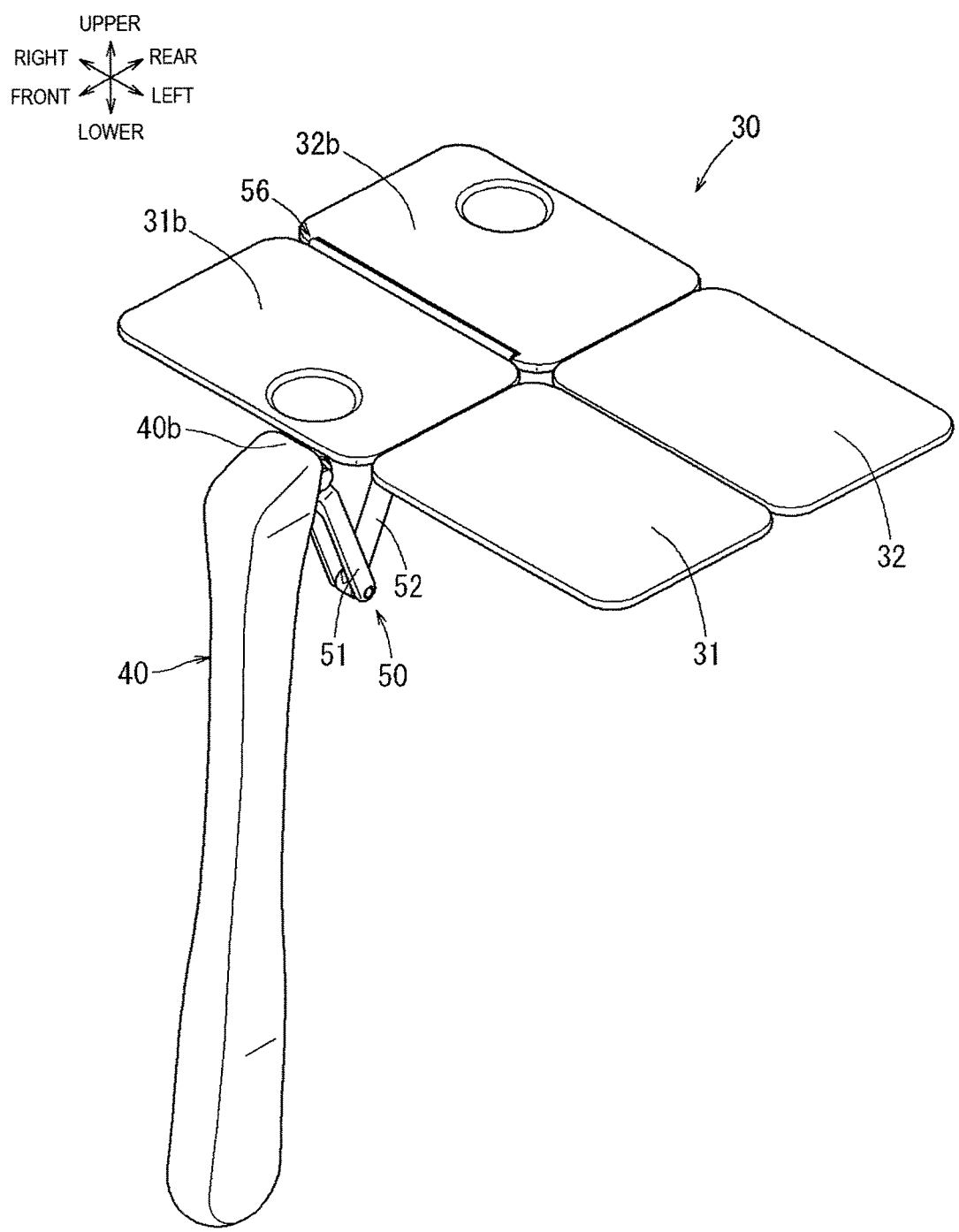
FIG. 14 is a perspective view showing the monitor device used as a table.
Figure 15:
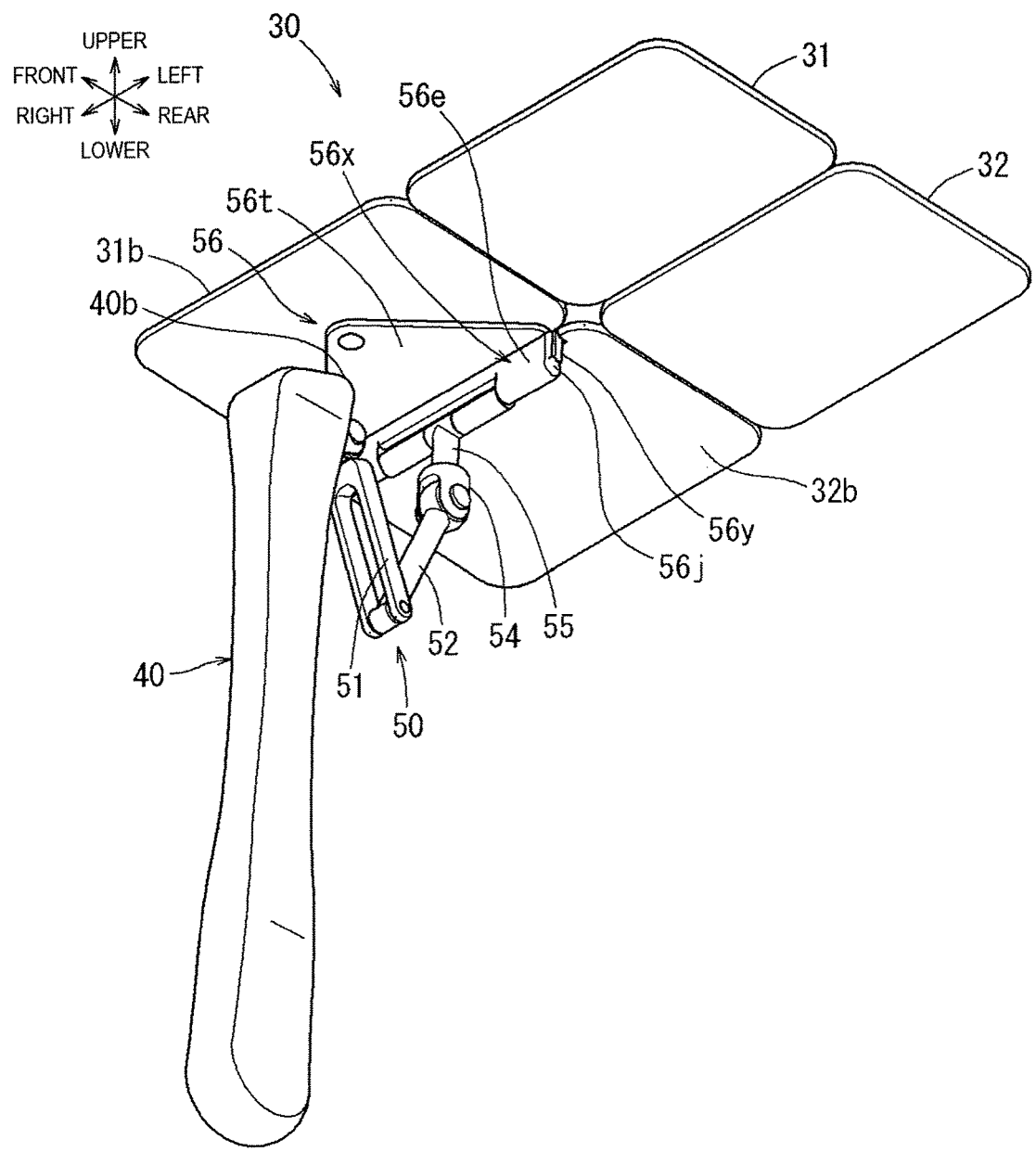
FIG. 15 is a perspective view of the monitor device used as a table as viewed from below.

As shown in FIG. 13, when the left seat 21 and the right seat 22 in the car interior are arranged to face each other, the first monitor 31, the first back plate 31b, the second monitor 32, and the second back plate 32b can be used as a table. In this case, for example, display (not shown) of a table mode displayed on the monitors 31, 32 is touched. Thus, as shown in FIGS. 13 to 15, the supporting column 40 of the monitor device 30 is inclined by a predetermined angle in the center direction of the left seat 21 and the right seat 22, and the first monitor 31 and the second monitor 32 are arranged at the center of the left seat 21 and the right seat 22. Next, as shown in FIGS. 14 and 15, the first link 51 and the second link 52 of the posture changing mechanism 50 are operated to adjust the first monitor 31 and the second monitor 32 to predetermined height positions.

Next, the bearing part 54 pivots with respect to the second link 52, and as shown in FIG. 15, the bearing part 54 and the rotation shaft 55 are held in an upright state. Accordingly, the hinge shaft 56j of the hinge mechanism 56 is held horizontally. In this state, the hinge mechanism 56 operates to unfold the first monitor 31 and the second monitor 32 to be horizontal. Next, the first monitor 31 moves horizontally with respect to the first back plate 31b of the first monitor 31. Similarly, the second monitor 32 moves horizontally with respect to the second back plate 32b of the second monitor 32. As a result, the first back plate 31b, the first monitor 31, the second back plate 32b, and the second monitor 32 are expanded on the same plane and can be used as a table.

Advantages of Monitor Device 30 of Car 10 According to Present Embodiment

According to the monitor device 30 of the car 10 according to the present embodiment, the monitors 31, 32 can be used for driving the car 10, and the monitors 31, 32 can be moved to each of the seats 21, 22 by the supporting column 40 (moving mechanism). Therefore, each of the seats 21, 22 can be used as the driver seat, and the driver seat can be changed. That is, an occupant seated on any one of the plurality of seats 21, 22 of the car 10 can perform driving operation of the car. Further, since the monitors 31, 32 of the monitor device 30 can be used as partition walls, it is possible to effectively use the monitors 31, 32 when they are not used as display devices and operation means. Further, since the two monitors 31, 32 can be used as one large-sized television (large viewing monitor), it is possible to enjoy the large-sized television from each seat. Further, since the two monitors 31, 32 can be used as individual televisions (individual viewing monitors), even when there is a fellow passenger, it is possible to ensure privacy and enjoy a user favorite image. Further, since the monitors 31, 32 can be used as a table, it is possible to effectively use the monitors 31, 32 when they are not used as display devices.

Modification

Here, the present disclosure is not limited to the above-described embodiment, and modifications can be made without departing from the scope of the present disclosure. For example, the driving mode of the monitor device 30 of the present embodiment shows an example in which the car 10 is driven by manually operating the image of steering wheel 310 displayed on the first monitor 31. However, it can be configured that the monitors 31, 32 are directly gripped, and the rotation shaft 55 of the posture changing mechanism 50 is rotated to drive the car 10. In the present embodiment, the monitor device 30 including the first monitor 31 and the second monitor 32 is exemplified. However, the number of monitors may be one or three or more. Further, the present embodiment shows an example in which the switching operation of the use mode of the monitor device 30 is performed on the screens of the monitors 31, 32. However, it is also possible to perform the switching operation of the use mode of the monitor device 30 on the seats 21, 22 or an instrument panel side. Further, it is shown an example in which the moving mechanism in the monitor device 30 is configured by the supporting column 40 standing on the floor surface F. However, it can also be performed by the supporting column provided on a ceiling. Further, it can also be configured that the monitors 31, 32 are moved by using the slide mechanism and the elevating mechanism. The car 10 including the left and right seats 21, 22 is exemplified. However, in the car including the front seat and the rear seat, it can also be configured that the monitors 31, 32 are moved to the rear seat so that the car 10 can be driven.

The disclosure provides illustrative, non-limiting examples as follows:

A first aspect of the disclosure is a vehicle monitor device for a vehicle that includes at least a first seat and a second seat, the vehicle monitor device including: a monitor which is electrically connected to a computer of the vehicle and which can be used for driving the vehicle; and a moving mechanism capable of moving the monitor between a position where the monitor can be used for driving by an occupant seated on the first seat and a position where the monitor can be used for driving by an occupant seated on the second seat.

According to the present disclosure, the monitor can be used for driving the vehicle, and the monitor can be moved by the moving mechanism between a position where the monitor can be used for driving by the occupant seated on the first seat and a position where the monitor can be used for driving by the occupant seated in the second seat. Therefore, either the first seat or the second seat can be used as the driver seat, and the driver seat can be changed. That is, the occupant seated on any one of the plurality of seats of the vehicle can perform driving operation of the vehicle.

According to a second aspect of the disclosure, the vehicle monitor device includes a posture changing mechanism capable of changing a posture of the monitor, and the moving mechanism is configured to arrange the monitor between the first seat and the second seat, and the posture changing mechanism is configured to change the posture of the monitor arranged between the first seat and the second seat by the moving mechanism so as to form a partition wall shape. Therefore, it is possible to effectively use the monitor when it is not used as a display device and operation means.

According to a third aspect of the disclosure, the monitor includes a plurality of plate-shaped monitor components, and the posture changing mechanism is configured to change each posture of the monitor components to make monitor surfaces of the plurality of monitor components flush with each other and face toward a direction of at least one of the first seat and the second seat, so that the monitor components can be used as a single monitor. In this way, since the monitor components can be used as a large viewing monitor, it is possible to enjoy the viewing monitor from each seat.

According to a fourth aspect of the disclosure, the monitor includes a plurality of plate-shaped monitor components, and the posture changing mechanism is configured to change each posture of the monitor components so that the plurality of monitor components can be arranged in an overlapped manner According to a fifth aspect of the disclosure, the first seat and the second seat are arranged to face each other, the moving mechanism moves the plurality of monitor components to a position between the first seat and the second seat, and the posture changing mechanism is configured to change a posture of one monitor component so as to face the first seat, and is configured to change a posture of another monitor component so as to face the second seat. Therefore, even when there is a fellow passenger, it is possible to ensure privacy and enjoy a user favorite image.

According to a sixth aspect of the disclosure, the posture changing mechanism is configured to hold the plurality of monitor components horizontally so that the monitor surfaces face upward, so that the monitor components can be used as a table. Therefore, it is possible to effectively use the monitor components when they are not used as display devices or the like. Since the monitor components are arranged such that the monitor surfaces face upward, even when driving is required while being used as a table, it can be operated instantaneously.

According to a seventh aspect of the disclosure, the monitor components are provided with back plates, respectively, each of the back plates being provided on a respective back surface of the monitor components in an overlapped manner, and the posture changing mechanism is configured to relatively unfold the monitor components and the back plates, so that the monitor components and the back plates can be used as a table According to an eighth aspect of the disclosure, the moving mechanism includes a supporting column that is erected on a floor portion and that supports the monitor, and the supporting column is connected to the floor portion so as to be capable of inclining toward at least one side of radially outer sides of the supporting column with respect to the floor surface. Therefore, the moving mechanism can be prepared with a relatively simple configuration.

According to a ninth aspect of the disclosure, the posture changing mechanism includes: a link mechanism provided at a tip end of the supporting column; a hinge mechanism for supporting the monitor; and a rotation mechanism provided between the link mechanism and the hinge mechanism. Therefore, a degree of freedom in changing the posture of the monitor is increased.

According to the present disclosure, an occupant seated on any one of a plurality of seats of a car can perform driving operation of the car.

What is claimed is:

1. A vehicle monitor device for a vehicle that includes at least a first seat and a second seat,
the vehicle monitor device comprising:
a monitor which is electrically connected to a computer of the vehicle and which is configured for driving the vehicle; and
a movement support structure configured to move the monitor between a position where the monitor is usable for driving by an occupant seated on the first seat and a position where the monitor is usable for driving by an occupant seated on the second seat.

2. The vehicle monitor device according to claim 1, further comprising:
a posture changing mechanism configured to change a posture of the monitor,
wherein the movement support structure is configured to arrange the monitor between the first seat and the second seat, and
wherein the posture changing mechanism is configured to change the posture of the monitor arranged between the first seat and the second seat by the movement support structure so as to form a partition wall shape.

3. The vehicle monitor device according to claim 2,
wherein the monitor includes a plurality of plate-shaped monitor components, and
wherein the posture changing mechanism is configured to change a posture of the monitor components to make monitor surfaces of the plurality of monitor components flush with each other and face toward a direction of at least one of the first seat and the second seat, so that the monitor components can be used as a single monitor.

4. The vehicle monitor device according to claim 3,
wherein the first seat and the second seat are arranged to face each other,
wherein the movement support mechanism moves the plurality of monitor components to a position between the first seat and the second seat, and
wherein the posture changing mechanism is configured to change a posture of one monitor component so as to face the first seat, and is configured to change a posture of another monitor component so as to face the second seat.

5. The vehicle monitor device according to claim 3,
wherein the posture changing mechanism is configured to hold the plurality of monitor components horizontally so that the monitor surfaces face upward, whereby the monitor components comprise a table.

6. The vehicle monitor device according to claim 5,
wherein the monitor components are provided with back plates, respectively, each of the back plates being provided on a respective back surface of the monitor components in an overlapped manner, and
wherein the posture changing mechanism is configured to relatively unfold the monitor components and the back plates, so that the monitor components and the back plates comprise a table.

7. The vehicle monitor device according to claim 3,
wherein the posture changing mechanism is configured to hold the plurality of monitor components horizontally so that the monitor surfaces face upward, whereby the monitor components comprise a table.

8. The vehicle monitor device according to claim 7,
wherein the monitor components are provided with back plates, respectively, each of the back plates being provided on a respective back surface of the monitor components in an overlapped manner, and
wherein the posture changing mechanism is configured to relatively unfold the monitor components and the back plates, so that the monitor components and the back plates comprise a table.

9. The vehicle monitor device according to claim 2,
wherein the monitor includes a plurality of plate-shaped monitor components, and
wherein the posture changing mechanism is configured to change a posture of the monitor components so that the plurality of monitor components can be arranged in an overlapped manner.

10. The vehicle monitor device according to claim 1,
wherein the movement support structure includes a supporting column that is erected on a floor portion and that supports the monitor, and
wherein the supporting column is connected to the floor portion and is configured to incline toward at least one side of radially outer sides of the supporting column with respect to the floor surface.

11. The vehicle monitor device according to claim 10,
wherein the posture changing mechanism includes: a link mechanism provided at a tip end of the supporting column; a hinge mechanism for supporting the monitor; and a rotation mechanism provided between the link mechanism and the hinge mechanism.

12. The vehicle monitor device according to claim 1,
wherein the movement support structure includes a supporting column that is erected on a floor portion and that supports the monitor, and
wherein the supporting column is connected to the floor portion and is configured to incline toward at least one side of radially outer sides of the supporting column with respect to the floor surface.

13. The vehicle monitor device according to claim 12,
wherein the posture changing mechanism includes: a link mechanism provided at a tip end of the supporting column; a hinge mechanism for supporting the monitor; and a rotation mechanism provided between the link mechanism and the hinge mechanism.

14. A vehicle monitor device for a vehicle that includes at least a first seat and a second seat, the vehicle monitor device comprising:
a monitor which is connected to a computer of the vehicle and which is configured for driving the vehicle;
a movement support structure configured to move the monitor between a position where the monitor is useable for driving by an occupant seated on the first seat and a position where the monitor is usable for driving by an occupant seated on the second seat, and
a posture changing mechanism that changes a posture of the monitor,
wherein the movement support structure positions the monitor between the first seat and the second seat, and
wherein the posture changing mechanism changes the posture of the monitor positioned between the first seat and the second seat by the movement support structure so as to form a partition wall shape.

15. The vehicle monitor device according to claim 14,
wherein the monitor includes a plurality of plate-shaped monitor components, and
wherein the posture changing mechanism is configured to change a posture of the monitor components to make monitor surfaces of the plurality of monitor components flush with each other and face toward a direction of at least one of the first seat and the second seat, so that the monitor components can be used as a single monitor.

16. The vehicle monitor device according to claim 15,
wherein the first seat and the second seat are arranged to face each other,
wherein the movement support mechanism moves the plurality of monitor components to a position between the first seat and the second seat, and
wherein the posture changing mechanism is configured to change a posture of one monitor component so as to face the first seat, and is configured to change a posture of another monitor component so as to face the second seat.

17. The vehicle monitor device according to claim 14,
wherein the monitor includes a plurality of plate-shaped monitor components, and
wherein the posture changing mechanism is configured to change a posture of the monitor components so that the plurality of monitor components can be arranged in an overlapped manner.

* * * * *